(12) United States Patent
Wang et al.

(10) Patent No.: US 11,914,222 B2
(45) Date of Patent: Feb. 27, 2024

(54) OPTICAL IMAGING SYSTEM

(71) Applicant: Zhejiang Sunny Optics Co., Ltd, Yuyao (CN)

(72) Inventors: Yuhao Wang, Yuyao (CN); Yang Li, Yuyao (CN); Lingbo He, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 454 days.

(21) Appl. No.: 17/141,862

(22) Filed: Jan. 5, 2021

(65) Prior Publication Data
US 2021/0278637 A1    Sep. 9, 2021

(30) Foreign Application Priority Data

Mar. 4, 2020 (CN) .......................... 202010149289.9

(51) Int. Cl.
*G02B 9/60* (2006.01)
*G02B 13/00* (2006.01)
*G02B 27/00* (2006.01)

(52) U.S. Cl.
CPC ........... *G02B 9/60* (2013.01); *G02B 13/0045* (2013.01); *G02B 27/0025* (2013.01)

(58) Field of Classification Search
None
See application file for complete search history.

(56) References Cited

U.S. PATENT DOCUMENTS

| | | | |
|---|---|---|---|
| 9,488,808 B1 | 11/2016 | Chen et al. | |
| 11,644,641 B2* | 5/2023 | Jung | G02B 3/02 359/708 |
| 2014/0293459 A1* | 10/2014 | Noda | G02B 9/60 359/764 |
| 2019/0212527 A1* | 7/2019 | Jung | G02B 9/62 |
| 2021/0199923 A1* | 7/2021 | Jhang | G02B 9/62 |
| 2022/0159153 A1* | 5/2022 | Zhang | G02B 15/145117 |

FOREIGN PATENT DOCUMENTS

CN    104330876 A    2/2015

OTHER PUBLICATIONS

First Examination Report for Application No. 202114000618, dated Jan. 4, 2022, 5 pages.

* cited by examiner

*Primary Examiner* — Darryl J Collins
(74) *Attorney, Agent, or Firm* — Barnes & Thornburg LLP

(57) ABSTRACT

The present disclosure discloses an optical imaging system including, sequentially from an object side to an image side along an optical axis, a first lens having refractive power; a second lens having negative refractive power; a third lens having negative refractive power; a fourth lens having refractive power, a convex object-side surface and a concave image-side surface; and a fifth lens having refractive power. A distance TTL along the optical axis from an object-side surface of the first lens to an imaging plane of the optical imaging system and half of a diagonal length ImgH of an effective pixel area on the imaging plane of the optical imaging system satisfy: $1.0<TTL/ImgH<1.5$.

19 Claims, 9 Drawing Sheets

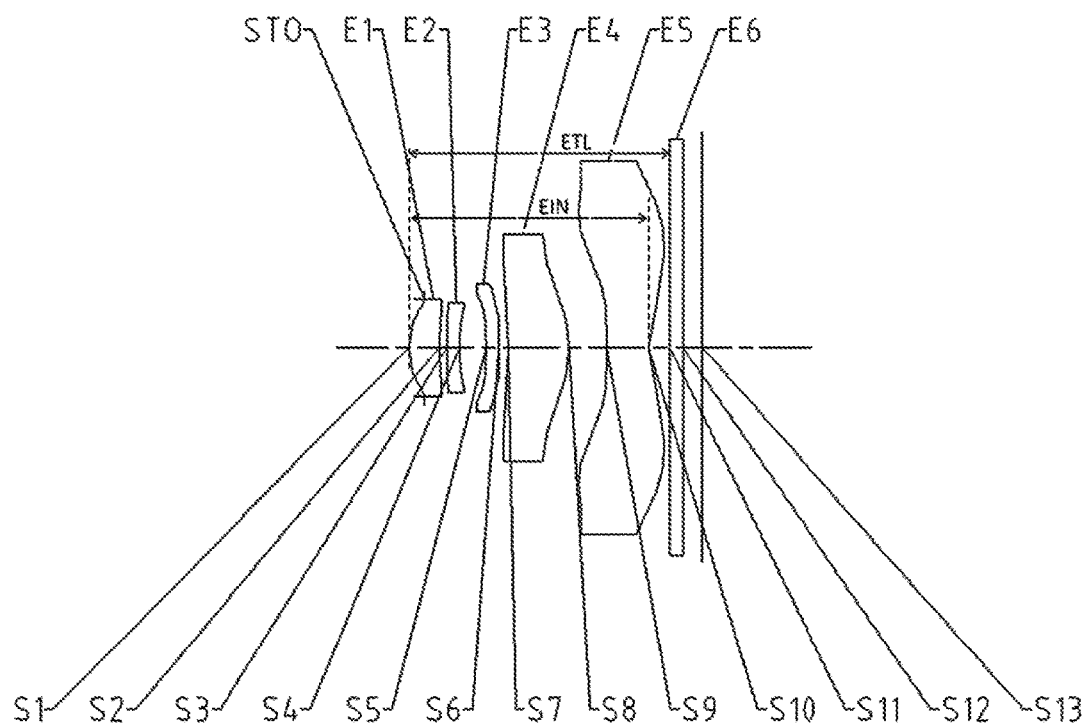
Fig. 1
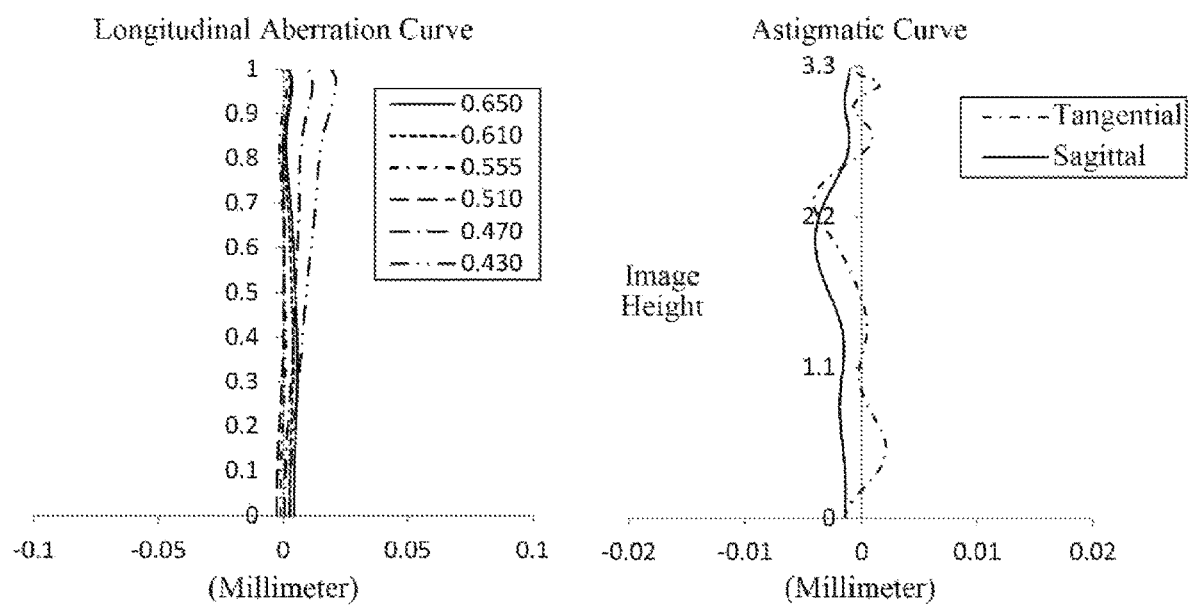
Fig. 2A
Fig. 2B

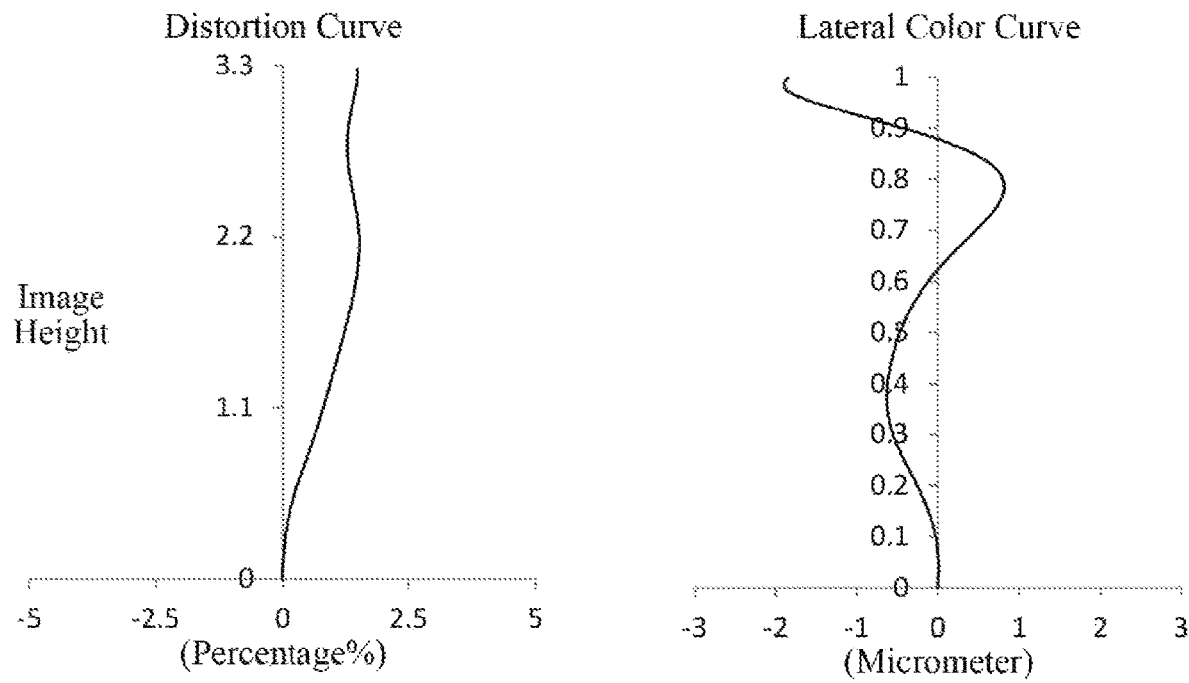
Fig. 2C
Fig. 2D
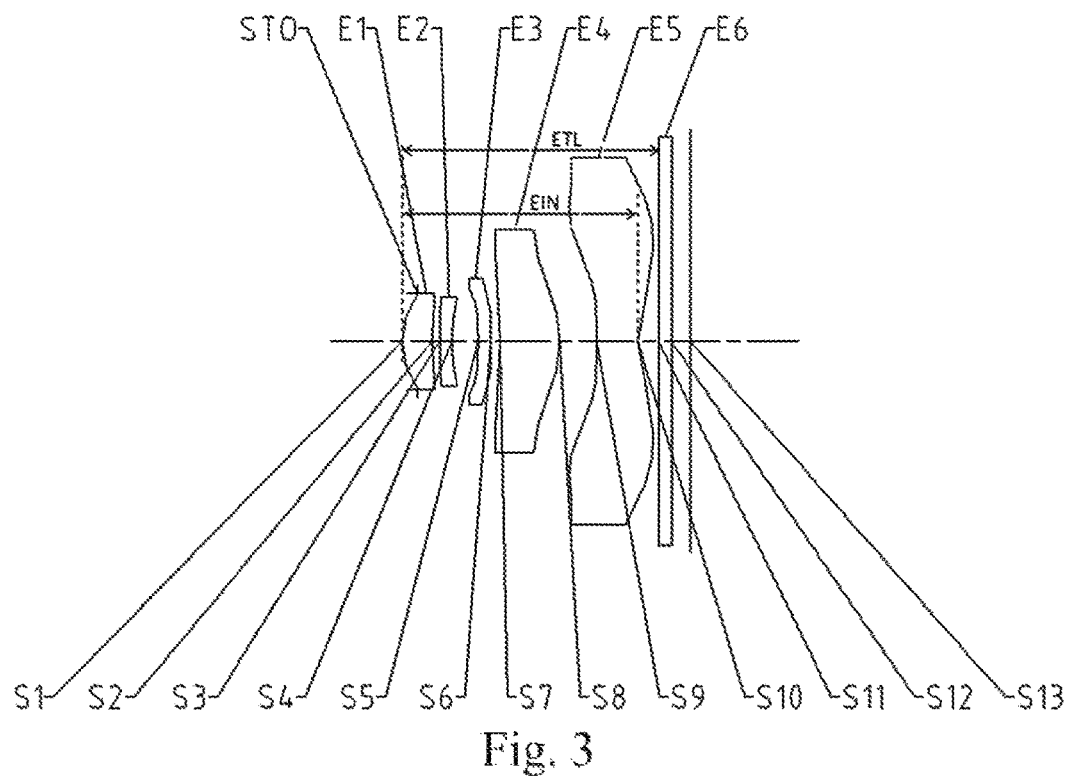
Fig. 3

OPTICAL IMAGING SYSTEM

CROSS-REFERENCE TO RELATED APPLICATION

This application claims benefit of priority to Chinese Patent Application No. 202010149289.9 filed on Mar. 4, 2020 before the China National Intellectual Property Administration, the entire disclosure of which is incorporated herein by reference in its entity.

TECHNICAL FIELD

The present disclosure relates to the field of optical elements, and specifically, relates to an optical imaging system.

BACKGROUND

With the advancement of technology, portable electronic products, such as smart phones, have developed rapidly. On the one hand, users' requirements for the image quality of portable electronic products, such as smart phones, continue to increase. On the other hand, while users are pursuing higher-pixel cameras, they also hope that portable electronic products, such as smart phones, may be made more and more thinner and easier to carry. However, the two aspects often conflict in traditional lens design, and lens assemblies with high image quality usually have a larger size.

Therefore, how to use the shortest possible lens assembly length to collect more light information, keep small optical aberrations and good image quality, and reserve enough physical space for the module and the terminal to facilitate the design of portable electronic products, such as smartphones, are the problems that major lens assembly manufacturers need to solve urgently.

SUMMARY

In one aspect, the present disclosure provides an optical imaging system which includes, sequentially from an object side to an image side along an optical axis, a first lens having refractive power; a second lens having negative refractive power; a third lens having negative refractive power; a fourth lens having refractive power, a convex object-side surface and a concave image-side surface; and a fifth lens having refractive power. A distance TTL along the optical axis from an object-side surface of the first lens to an imaging plane of the optical imaging system and half of a diagonal length ImgH of an effective pixel area on the imaging plane of the optical imaging system may satisfy: $1.0<TTL/ImgH<1.5$.

In one embodiment, at least one of the object-side surface of the first lens to an image-side surface of the fifth lens is aspheric.

In one embodiment, a sum of the spaced intervals $\Sigma AT$ along the optical axis between each two adjacent lenses of the first lens to the fifth lens and a spaced interval T34 between the third lens and the fourth lens along the optical axis may satisfy: $5.5<\Sigma AT/T34<9.0$.

In one embodiment, a total effective focal length f of the optical imaging system, an effective focal length f2 of the second lens and an effective focal length f4 of the fourth lens may satisfy: $-2.0<f/(f2+f4)<-0.5$.

In one embodiment, a spaced interval T12 between the first lens and the second lens along the optical axis, a spaced interval T23 between the second lens and the third lens along the optical axis and a spaced interval T45 between the fourth lens and the fifth lens along the optical axis may satisfy: $1.5<(T12+T45)/T23<3.5$.

In one embodiment, an effective focal length f4 of the fourth lens, a radius of curvature R8 of the image-side surface of the fourth lens and a radius of curvature R10 of an image-side surface of the fifth lens may satisfy: $1.1<f4/(|R8|+R10)<2.0$.

In one embodiment, a radius of curvature R2 of an image-side surface of the first lens, a radius of curvature R3 of an object-side surface of the second lens, a radius of curvature R4 of an image-side surface of the second lens and a radius of curvature R6 of an image-side surface of the third lens may satisfy: $2.0<(|R6|+R3)/(R2+R4)<5.0$.

In one embodiment, a center thickness CT4 of the fourth lens along the optical axis and a spaced interval T34 between the third lens and the fourth lens along the optical axis may satisfy: $3.0<CT4/T34<6.5$.

In one embodiment, the optical imaging system may satisfy: $1.0<ETL/EIN<1.5$, where ETL is a distance from the object-side surface of the first lens to the imaging plane of the optical imaging system parallel to the optical axis at ½ of an entrance pupil diameter of the optical imaging system, and EIN is a distance from the object-side surface of the first lens to an image-side surface of the fifth lens parallel to the optical axis at ½ of the entrance pupil diameter of the optical imaging system.

In one embodiment, an edge thickness ET5 of the fifth lens and an edge thickness ET1 of the first lens may satisfy: $1.0<ET5/ET1<3.5$.

In one embodiment, a combined focal length f23 of the second lens and the third lens and an effective focal length f5 of the fifth lens may satisfy: $1.0<f23/f5<2.0$.

In one embodiment, a center thickness CT4 of the fourth lens along the optical axis and an edge thickness ET4 of the fourth lens may satisfy: $1.5<CT4/ET4<2.0$.

In one embodiment, a combined focal length f12 of the first lens and the second lens and a total effective focal length f of the optical imaging system may satisfy: $1.0<f12/f<1.5$.

In one embodiment, a maximum effective radius DT11 of the object-side surface of the first lens, a maximum effective radius DT21 of an object-side surface of the second lens, and a maximum effective radius DT51 of an object-side surface of the fifth lens may satisfy: $1.5<DT51/(DT11+DT21)<2.0$.

In one embodiment, a center thickness CT5 of the fifth lens along the optical axis and a center thickness CT3 of the third lens along the optical axis may satisfy: $1.5<CT5/CT3<3.5$.

In another aspect, the present disclosure provides an optical imaging system which includes, sequentially from an object side to an image side along an optical axis, a first lens having refractive power; a second lens having negative refractive power; a third lens having negative refractive power; a fourth lens having refractive power; and a fifth lens having refractive power. ETL, being a distance from an object-side surface of the first lens to an imaging plane of the optical imaging system parallel to the optical axis at ½ of an entrance pupil diameter of the optical imaging system, and EIN, being a distance from the object-side surface of the first lens to an image-side surface of the fifth lens parallel to the optical axis at ½ of the entrance pupil diameter of the optical imaging system, may satisfy: $1.0<ETL/EIN<1.5$.

In one embodiment, an object-side surface of the fourth lens may be convex, and an image-side surface of the fourth lens may be concave.

The present disclosure employs a plurality of (for example, five) lenses. The optical imaging system has at least one beneficial effect, such as ultra-thinness and good image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent by reading the detailed description of the non-limiting embodiments with reference to the accompanying drawings:

FIG. 1 illustrates a schematic structural view of an optical imaging system according to example 1 of the present disclosure;

FIGS. 2A to 2D illustrate a longitudinal aberration curve, an astigmatic curve, a distortion curve, and a lateral color curve of the optical imaging system of the example 1, respectively;

FIG. 3 illustrates a schematic structural view of an optical imaging system according to example 2 of the present disclosure;

DETAILED DESCRIPTION OF EMBODIMENTS

Figure 4A:
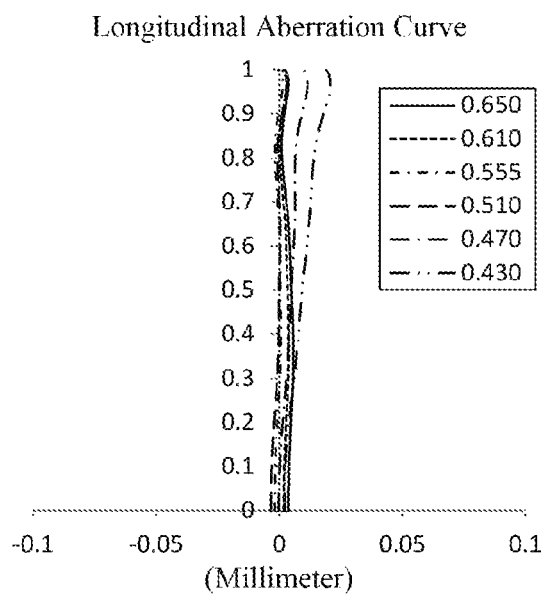
FIGS. 4A to 4D illustrate a longitudinal aberration curve, an astigmatic curve, a distortion curve, and a lateral color curve of the optical imaging system of the example 2, respectively.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include five lenses having refractive power, which are a first lens, a second lens, a third lens, a fourth lens and a fifth lens. The five lenses are arranged sequentially from an object side to an image side along an optical axis. Among the first lens to the fifth lens, there may be a spaced interval between each two adjacent lenses.

In an exemplary embodiment, the first lens may have positive or negative refractive power; the second lens may have negative refractive power; the third lens may have negative refractive power; the fourth lens may have positive or negative refractive power, an object-side surface thereof may be convex, and an image-side surface thereof may be concave; and the fifth lens may have positive or negative refractive power.

By configuring the second lens to have negative optical power, the light may be diverged outward, so that the system has a larger field-of-view and may match the chief ray angle of the high-pixel chip. By configuring the third lens to have negative refractive power, the optical magnification may be adjusted, the aberration caused by the first two lenses may be corrected, and the light may be further diverged, which is beneficial to achieve an optical system with a small aperture and a large imaging plane.

In an exemplary embodiment, an object-side surface of the fourth lens may be convex, and an image-side surface thereof may be concave. The convex-concave surface design of the fourth lens is beneficial for the fourth lens to better converge light, compensate various aberrations, facilitate structural layout, and reduce the structural sensitivity.

In an exemplary embodiment, the optical imaging system according to the present disclosure may satisfy: $1.0<TTL/ImgH<1.5$, where TTL is a distance along the optical axis from an object-side surface of the first lens to an imaging plane of the optical imaging system, and ImgH is half of a diagonal length of an effective pixel area on the imaging plane of the optical imaging system. More specifically, TTL and ImgH may further satisfy: $1.2<TTL/ImgH<1.5$. When $1.0<TTL/ImgH<1.5$ is satisfied, the total length of the lens assembly may be reduced as much as possible while ensuring a larger imaging plane, so as to achieve the purpose of ultra-thin.

In an exemplary embodiment, the optical imaging system according to the present disclosure may satisfy: $5.5<\Sigma AT/T34<9.0$, where $\Sigma AT$ is a sum of the spaced intervals along the optical axis between each two adjacent lenses of the first lens to the fifth lens, and T34 is a spaced interval between the third lens and the fourth lens along the optical axis. More specifically, $\Sigma AT$ and T34 may further satisfy: $5.6<\Sigma AT/T34<8.9$. When $5.5<\Sigma AT/T34<9.0$ is satisfied, it is beneficial to balance the sensitivity of the spaced interval between two adjacent lenses, thereby avoiding excessive concentration of sensitivity. By reasonably controlling the spaced interval between the third lens and the fourth lens along the optical axis, it is beneficial to make the third lens and the fourth lens being closer, thereby facilitating the layout of the structure.

In an exemplary embodiment, the optical imaging system according to the present disclosure may satisfy: $-2.0<f/(f2+f4)<-0.5$, where f is a total effective focal length of the optical imaging system, f2 is an effective focal length of the second lens, and f4 is an effective focal length of the fourth lens. More specifically, f, f2 and f4 may further satisfy: $-1.6<f/(f2+f4)<-0.9$. Satisfying $-2.0<f/(f2+f4)<-0.5$ may reduce the deflection angle of the light and reduce the sensitivity of the system.

In an exemplary embodiment, the optical imaging system according to the present disclosure may satisfy: $1.5<(T12+T45)/T23<3.5$, where T12 is a spaced interval between the first lens and the second lens along the optical axis, T23 is a spaced interval between the second lens and the third lens along the optical axis, and T45 is a spaced interval between the fourth lens and the fifth lens along the optical axis. More specifically, T12, T45 and T23 may further satisfy: $1.5<(T12+T45)/T23<3.2$. Satisfying $1.5<(T12+T45)/T23<3.5$ may make the optical system have a better ability to compensate dispersion. Reasonable control of the three spaced intervals is beneficial to reduce the assembly sensitivity of the system, thereby facilitating assembly production.

In an exemplary embodiment, the optical imaging system according to the present disclosure may satisfy: $1.1<f4/(|R8|+R10)<2.0$, where f4 is an effective focal length of the fourth lens, R8 is a radius of curvature of the image-side surface of the fourth lens, and R10 is a radius of curvature of an image-side surface of the fifth lens. More specifically, f4, R8 and R10 may further satisfy: $1.1<f4/(|R8|+R10)<1.6$. Satisfying $1.1<f4/(|R8|+R10)<2.0$ may reduce the off-axis chromatic aberration of the optical system and effectively increase the total effective focal length of the lens assembly. Also, by reasonably assigning the refractive power of the fourth lens, the processing sensitivity of actual parts may be reduced, thereby improving the production yield of the lens assembly.

In an exemplary embodiment, the optical imaging system according to the present disclosure may satisfy: $2.0<(|R6|+R3)/(R2+R4)<5.0$, where R2 is a radius of curvature of an image-side surface of the first lens, R3 is a radius of curvature of an object-side surface of the second lens, R4 is a radius of curvature of an image-side surface of the second lens, and R6 is a radius of curvature of an image-side surface of the third lens. More specifically, R6, R3, R2 and R4 may further satisfy: $2.3<(|R6|+R3)/(R2+R4)<4.8$. Satisfying $2.0<(|R6|+R3)/(R2+R4)<5.0$ may make the optical system better match the chief ray angle of the chip, which is beneficial for the optical system to more easily compensate field curvature and distortion.

In an exemplary embodiment, the optical imaging system according to the present disclosure may satisfy: $3.0<CT4/T34<6.5$, where CT4 is a center thickness of the fourth lens along the optical axis, and T34 is a spaced interval between the third lens and the fourth lens along the optical axis. Satisfying $3.0<CT4/T34<6.5$ may effectively ensure the processing manufacturability of the third lens and the fourth lens, which is more conducive to the molding characteristics of the plastic lens, and is conducive to the stable production and assembly.

In an exemplary embodiment, the optical imaging system according to the present disclosure may satisfy: $1.0<ETL/EIN<1.5$, where ETL is a distance from an object-side surface of the first lens to an imaging plane of the optical imaging system parallel to the optical axis at ½ of an entrance pupil diameter of the optical imaging system, and EIN is a distance from the object-side surface of the first lens to an image-side surface of the fifth lens parallel to the optical axis at ½ of the entrance pupil diameter of the optical imaging system. More specifically, ETL and EIN may further satisfy: $1.1<ETL/EIN<1.3$. Satisfying $1.0<ETL/EIN<1.5$ is beneficial to reducing the total length of the optical system. At the same time, controlling the chief ray angle of the optical system facilitates the matching of the optical system and the chip.

In an exemplary embodiment, the optical imaging system according to the present disclosure may satisfy: $1.0<ET5/ET1<3.5$, where ET5 is an edge thickness of the fifth lens, and ET1 is an edge thickness of the first lens. More specifically, ET5 and ET1 may further satisfy: $1.1<ET5/ET1<3.3$. Satisfying $1.0<ET5/ET1<3.5$ may ensure that the edge thicknesses of the lenses may meet the actual processing requirements. At the same time, it is beneficial to increase the relative brightness of the edge field-of-view and reduce the chromatic aberration of the edge field-of-view.

In an exemplary embodiment, the optical imaging system according to the present disclosure may satisfy: 1.0<f23/f5<2.0, where f23 is a combined focal length of the second lens and the third lens, and f5 is an effective focal length of the fifth lens. More specifically, f23 and f5 may further satisfy: 1.4<f23/f5<1.9. When 1.0<f23/f5<2.0 is satisfied, the distortion at the edge of the optical system may be effectively reduced, which is beneficial to ensure the relative brightness of the edge field-of-view, so that the optical system has a better imaging effect.

In an exemplary embodiment, the optical imaging system according to the present disclosure may satisfy: 1.5<CT4/ET4<2.0, where CT4 is a center thickness of the fourth lens along the optical axis, and ET4 is an edge thickness of the fourth lens. More specifically, CT4 and ET4 may further satisfy: 1.5<CT4/ET4<1.9. Satisfying 1.5<CT4/ET4<2.0 may indirectly control the thickness ratio of the fourth lens, making the fourth lens more in line with the molding requirements and avoiding weld marks. The thickness ratio of the fourth lens refers to the ratio of the maximum thickness to the minimum thickness of the fourth lens.

In an exemplary embodiment, the optical imaging system according to the present disclosure may satisfy: 1.0<f12/f<1.5, where f12 is a combined focal length of the first lens and the second lens, and f is a total effective focal length of the optical imaging system. More specifically, f12 and f may further satisfy: 1.0<f12/f<1.3. Satisfying 1.0<f12/f<1.5 may make the optical system have a better ability to compensate field curvature, so that the optical system has better image quality.

In an exemplary embodiment, the optical imaging system according to the present disclosure may satisfy: 1.5<DT51/(DT11+DT21)<2.0, where DT11 is a maximum effective radius of an object-side surface of the first lens, DT21 is a maximum effective radius of an object-side surface of the second lens, and DT51 is a maximum effective radius of an object-side surface of the fifth lens. Satisfying 1.5<DT51/(DT11+DT21)<2.0 helps to ensure that the lens assembly has a longer focal length, and may appropriately control the depth of field range, which is beneficial to meet the shooting needs required by most users.

In an exemplary embodiment, the optical imaging system according to the present disclosure may satisfy: 1.5<CT5/CT3<3.5, where CT5 is a center thickness of the fifth lens along the optical axis, and CT3 is a center thickness of the third lens along the optical axis. More specifically, CT5 and CT3 may further satisfy: 1.6<CT5/CT3<3.3. Satisfying 1.5<CT5/CT3<3.5 may make the lenses more in line with the process molding requirements, so as to avoid welding marks.

In an exemplary embodiment, the optical imaging system according to the present disclosure may further include a stop disposed between the object side and the first lens. Optionally, the above optical imaging system may further include an optical filter for correcting the color deviation and/or a protective glass for protecting the photosensitive element located on an imaging plane.

The optical imaging system according to the above embodiments of the present disclosure may employ a plurality of lenses, such as five lenses as described above. By properly configuring the refractive power of each lens, the surface shape, the center thickness of each lens, and spaced intervals along the optical axis between the lenses, the incident light may be effectively converged, the total length of the optical imaging system may be reduced, and the workability of the optical imaging system may be improved, such that the structure of each lens is more compact, the optical imaging lens assembly is more advantageous for production processing, and has higher practicability.

Through the above configuration, the optical imaging system according to the exemplary embodiment of the present disclosure may have characteristics, such as ultra-thinness, small aberration, good image quality, and the like.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking five lenses as an example, the optical imaging system is not limited to include five lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 380.0000 | | | | |
| STO | Spherical | Infinite | −0.2456 | | | | |
| S1 | Aspheric | 1.3376 | 0.4767 | 1.55 | 56.1 | 2.93 | −0.2806 |
| S2 | Aspheric | 7.1664 | 0.1180 | | | | 80.1592 |
| S3 | Aspheric | 15.3880 | 0.2000 | 1.68 | 19.2 | −7.18 | 90.0000 |
| S4 | Aspheric | 3.6768 | 0.4179 | | | | 8.1164 |
| S5 | Aspheric | 67.9194 | 0.2000 | 1.67 | 20.4 | −18.99 | −90.0000 |
| S6 | Aspheric | 10.6573 | 0.1500 | | | | −90.0000 |
| S7 | Aspheric | −13.7011 | 0.9675 | 1.55 | 56.1 | 4.32 | −90.0000 |
| S8 | Aspheric | −2.0627 | 0.5874 | | | | −13.5052 |
| S9 | Aspheric | 5.6457 | 0.6570 | 1.54 | 55.9 | −3.31 | −90.0000 |
| S10 | Aspheric | 1.2962 | 0.3353 | | | | −5.9877 |
| S11 | Spherical | Infinite | 0.2100 | 1.52 | 64.2 | | |
| S12 | Spherical | Infinite | 0.3019 | | | | |
| S13 | Spherical | Infinite | | | | | |

In this example, a total effective focal length f of the optical imaging system is 3.79 mm, a total length TTL of the optical imaging system (that is, a distance along the optical axis from the object-side surface S1 of the first lens E1 to the imaging plane S13 of the optical imaging system) is 4.62 mm, half of a diagonal length ImgH of an effective pixel area on the imaging plane S13 of the optical imaging system is 3.28 mm, half of a maximum field-of-view Semi-FOV of the optical imaging system is 40.0°, an aperture value Fno of the optical imaging system is 2.48, a distance ETL from the object-side surface of the first lens to the imaging plane of the optical imaging system parallel to the optical axis at ½ of an entrance pupil diameter of the optical imaging system is 4.37 mm, and a distance EIN from the object-side surface of the first lens to the image-side surface of the fifth lens parallel to the optical axis at ½ of the entrance pupil diameter of the optical imaging system is 3.67 mm.

$$x = \frac{ch^2}{1 + \sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S10 in example 1.

TABLE 2

| Surface number | A4 | A6 | A8 | A10 | A12 |
|---|---|---|---|---|---|
| S1 | 2.8562E−02 | 7.3677E−02 | −3.4351E−01 | 1.4804E+00 | −3.3245E+00 |
| S2 | −3.4969E−02 | 5.5903E−02 | −6.1699E−01 | 4.7674E+00 | −2.1678E+01 |
| S3 | −2.8300E−02 | 4.4629E−02 | 7.1465E−01 | −5.9370E+00 | 3.0224E+01 |
| S4 | −1.5793E−02 | 2.4351E−01 | −1.4671E+00 | 1.0254E+01 | −4.6154E+01 |
| S5 | −3.2973E−01 | 2.5669E−01 | −1.7842E+00 | 8.6692E+00 | −2.7582E+01 |
| S6 | −3.2986E−01 | 2.6454E−01 | −8.4324E−01 | 2.5536E+00 | −4.9433E+00 |
| S7 | −1.0540E−01 | 1.2507E−01 | −3.4126E−01 | 9.6942E−01 | −1.3744E+00 |
| S8 | −2.3739E−01 | 3.2929E−01 | −3.7793E−01 | 3.5997E−01 | −2.2530E−01 |
| S9 | −2.7847E−01 | 1.7643E−01 | −6.8546E−02 | 2.0067E−02 | −4.3777E−03 |
| S10 | −1.0493E−01 | 5.8143E−02 | −2.3339E−02 | 6.6077E−03 | −1.3135E−03 |

| Surface number | A14 | A16 | A18 | A20 |
|---|---|---|---|---|
| S1 | 3.4085E+00 | 1.0575E+00 | −5.4088E+00 | 3.4553E+00 |
| S2 | 5.8324E+01 | −9.1958E+01 | 7.9041E+01 | −2.9208E+01 |
| S3 | −9.7504E+01 | 1.9165E+02 | −2.0751E+02 | 9.4573E+01 |
| S4 | 1.3336E+02 | −2.3782E+02 | 2.3904E+02 | −1.0331E+02 |
| S5 | 5.4980E+01 | −6.5593E+01 | 4.3556E+01 | −1.2608E+01 |
| S6 | 6.2869E+00 | −4.8082E+00 | 1.9914E+00 | −3.4779E−01 |
| S7 | 1.0757E+00 | −4.8455E−01 | 1.1863E−01 | −1.2290E−02 |
| S8 | 8.7411E−02 | −2.0449E−02 | 2.6567E−03 | −1.4776E−04 |
| S9 | 6.6776E−04 | −6.6047E−05 | 3.7774E−06 | −9.4601E−08 |
| S10 | 1.7662E−04 | −1.5176E−05 | 7.5278E−07 | −1.6438E−08 |

In example 1, the object-side surface and the image-side surface of any one of the first lens E1 to the fifth lens E5 are aspheric. The surface shape x of each aspheric lens may be defined by using, but not limited to, the following aspheric formula:

FIG. 2A illustrates a longitudinal aberration curve of the optical imaging system according to example 1, representing deviations of focal points converged by light of different wavelengths after passing through the lens assembly. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion corresponding to different image heights. FIG. 2D illustrates a lateral color curve of the optical imaging system according to example 1, representing deviations of different image heights on an imaging plane after light passes through the lens assembly. It can be seen from FIG. 2A to FIG. 2D that the optical imaging system provided in example 1 may achieve good image quality.

Example 2

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.79 mm, a total length TTL of the optical imaging system is 4.59 mm, half of a diagonal length ImgH of an effective pixel area on the imaging plane S13 of the optical imaging system is 3.28 mm, half of a maximum field-of-view Semi-FOV of the optical imaging system is 40.0°, an aperture value Fno of the optical imaging system is 2.48, a distance ETL from the object-side surface of the first lens to the imaging plane of the optical imaging system parallel to the optical axis at ½ of an entrance pupil diameter of the optical imaging system is 4.34 mm, and a distance EIN from the object-side surface of the first lens to the image-side surface of the fifth lens parallel to the optical axis at ½ of the entrance pupil diameter of the optical imaging system is 3.64 mm.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 380.0000 | | | | |
| STO | Spherical | Infinite | −0.2483 | | | | |
| S1 | Aspheric | 1.3261 | 0.4807 | 1.55 | 56.1 | 2.89 | −0.2755 |
| S2 | Aspheric | 7.2161 | 0.1161 | | | | 83.9860 |
| S3 | Aspheric | 13.3126 | 0.2000 | 1.68 | 19.2 | −7.09 | 80.3313 |
| S4 | Aspheric | 3.5068 | 0.4087 | | | | 7.8223 |
| S5 | Aspheric | −31.5298 | 0.2230 | 1.67 | 20.4 | −19.11 | 90.0000 |
| S6 | Aspheric | 21.4210 | 0.1626 | | | | −90.0000 |
| S7 | Aspheric | −10.6542 | 0.8957 | 1.55 | 56.1 | 4.59 | −90.0000 |
| S8 | Aspheric | −2.0907 | 0.6280 | | | | −15.3289 |
| S9 | Aspheric | 4.7710 | 0.6327 | 1.54 | 55.9 | −3.50 | −87.4050 |
| S10 | Aspheric | 1.2849 | 0.3349 | | | | −6.2881 |
| S11 | Spherical | Infinite | 0.2100 | 1.52 | 64.2 | | |
| S12 | Spherical | Infinite | 0.3015 | | | | |
| S13 | Spherical | Infinite | | | | | |

TABLE 4

| Surface number | A4 | A6 | A8 | A10 | A12 |
|---|---|---|---|---|---|
| S1 | 2.8350E−02 | 8.1588E−02 | −4.2953E−01 | 2.0512E+00 | −5.6115E+00 |
| S2 | −3.7762E−02 | 9.3387E−02 | −1.1119E+00 | 8.7890E+00 | −4.1772E+01 |
| S3 | −3.4596E−02 | 5.9335E−02 | 6.8331E−01 | −5.9153E+00 | 3.0855E+01 |
| S4 | −2.1264E−02 | 2.4845E−01 | −1.4349E+00 | 1.0274E+01 | −4.7778E+01 |
| S5 | −2.9515E−01 | 2.3537E−01 | −1.7158E+00 | 8.8501E+00 | −2.9059E+01 |
| S6 | −3.0239E−01 | 2.3122E−01 | −6.8215E−01 | 2.0597E+00 | −3.7466E+00 |
| S7 | −1.2149E−01 | 1.4538E−01 | −4.4869E−01 | 1.2541E+00 | −1.7526E+00 |
| S8 | −2.5476E−01 | 3.7283E−01 | −4.6247E−01 | 4.5647E−01 | −2.9002E−01 |
| S9 | −2.4681E−01 | 1.3559E−01 | −3.9311E−02 | 7.4854E−03 | −9.9595E−04 |
| S10 | −9.2447E−02 | 4.3305E−02 | −1.4172E−02 | 3.0831E−03 | 4.3597E−04 |

TABLE 4-continued

| Surface number | A14 | A16 | A18 | A20 |
|---|---|---|---|---|
| S1 | 9.0788E+00 | −7.3953E+00 | 1.5203E+00 | 1.0668E+00 |
| S2 | 1.2039E+02 | −2.0774E+02 | 1.9851E+02 | −8.1752E+01 |
| S3 | −1.0141E+02 | 2.0202E+02 | −2.2108E+02 | 1.0173E+02 |
| S4 | 1.4315E+02 | −2.6500E+02 | 2.7626E+02 | −1.2354E+02 |
| S5 | 5.9712E+01 | −7.3747E+01 | 5.0600E+01 | −1.5031E+01 |
| S6 | 4.4670E+00 | −3.2773E+00 | 1.3276E+00 | −2.3017E−01 |
| S7 | 1.3602E+00 | −6.0899E−01 | 1.4838E−01 | −1.5315E−02 |
| S8 | 1.1340E−01 | −2.6631E−02 | 3.4633E−03 | −1.9240E−04 |
| S9 | 9.3406E−05 | −5.9474E−06 | 2.3116E−07 | −4.1202E−09 |
| S10 | 3.6164E−05 | −1.2632E−06 | −2.1438E−08 | 2.0140E−09 |

Figure 4B:
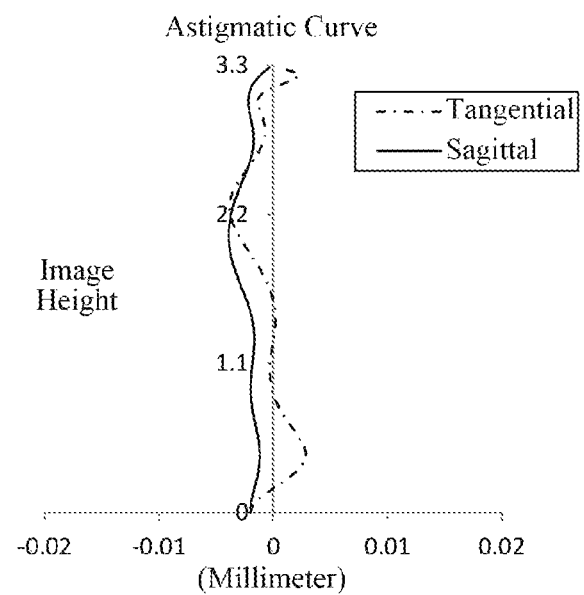
Figure 4C:
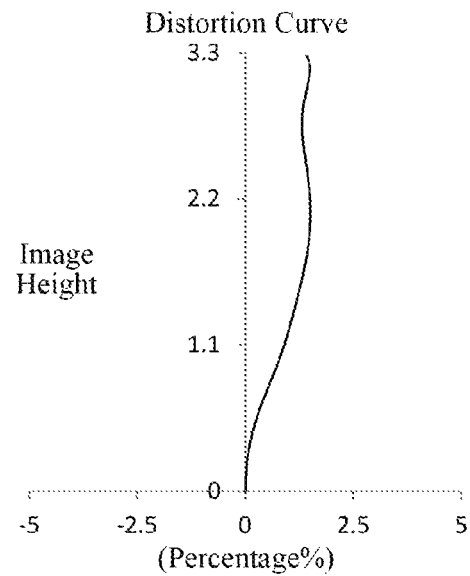
Figure 4D:
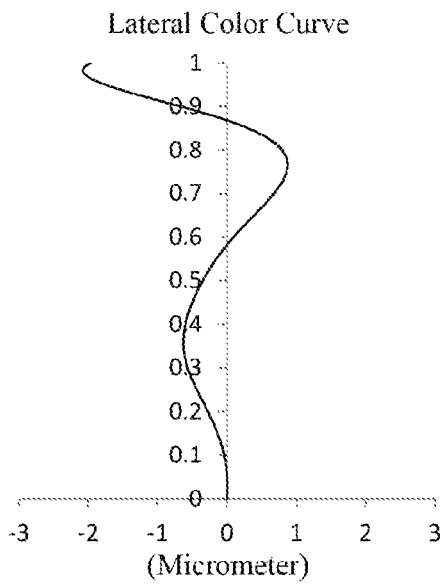

FIG. 4A illustrates a longitudinal aberration curve of the optical imaging system according to example 2, representing deviations of focal points converged by light of different wavelengths after passing through the lens assembly. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion corresponding to different image heights. FIG. 4D illustrates a lateral color curve of the optical imaging system according to example 2, representing deviations of different image heights on an imaging plane after light passes through the lens assembly. It can be seen from FIG. 4A to FIG. 4D that the optical imaging system provided in example 2 may achieve good image quality.

Example 3

Figure 5:
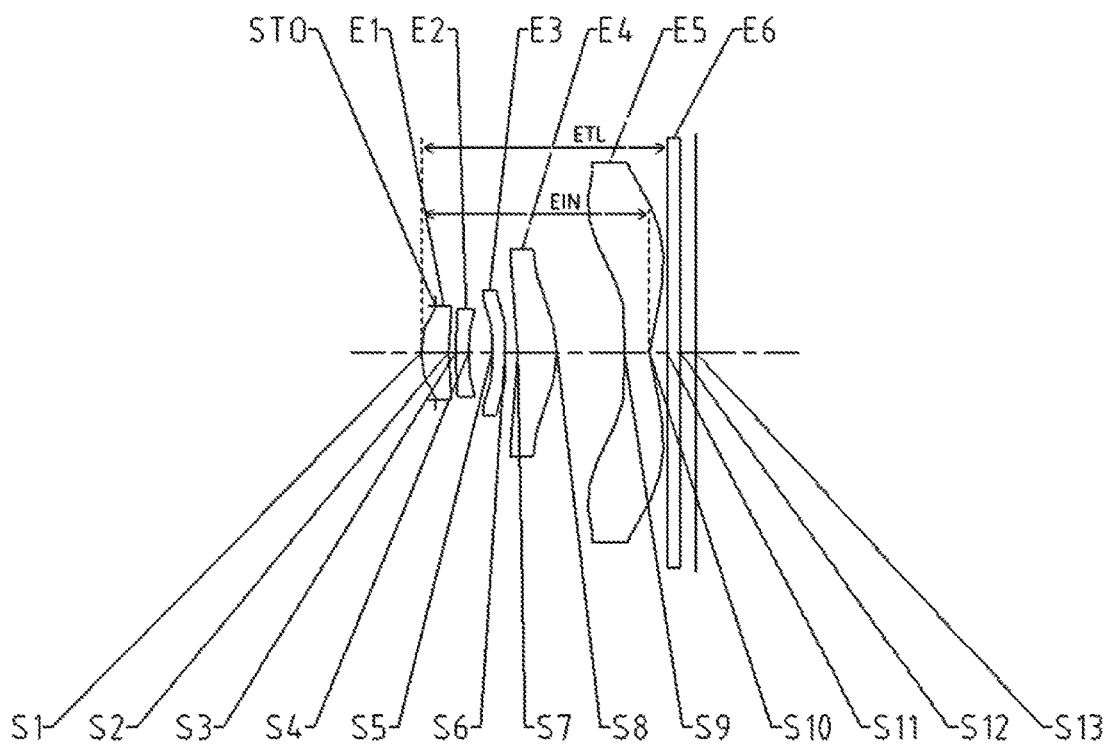
FIG. 5 illustrates a schematic structural view of an optical imaging system according to example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.60 mm, a total length TTL of the optical imaging system is 4.24 mm, half of a diagonal length ImgH of an effective pixel area on the imaging plane S13 of the optical imaging system is 3.38 mm, half of a maximum field-of-view Semi-FOV of the optical imaging system is 42.3°, an aperture value Fno of the optical imaging system is 2.48, a distance ETL from the object-side surface of the first lens to the imaging plane of the optical imaging system parallel to the optical axis at ½ of an entrance pupil diameter of the optical imaging system is 4.00 mm, and a distance EIN from the object-side surface of the first lens to the image-side surface of the fifth lens parallel to the optical axis at ½ of the entrance pupil diameter of the optical imaging system is 3.43 mm.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 380.0000 | | | | |
| STO | Spherical | Infinite | −0.2204 | | | | |
| S1 | Aspheric | 1.2841 | 0.4262 | 1.55 | 56.1 | 2.92 | −0.2364 |
| S2 | Aspheric | 5.8092 | 0.1074 | | | | 60.2941 |
| S3 | Aspheric | 8.4874 | 0.2000 | 1.68 | 19.2 | −6.91 | −4.2699 |
| S4 | Aspheric | 2.9880 | 0.3626 | | | | 7.4979 |
| S5 | Aspheric | −59.6793 | 0.2000 | 1.67 | 20.4 | −23.10 | −90.0000 |
| S6 | Aspheric | 20.7796 | 0.1929 | | | | 90.0000 |
| S7 | Aspheric | −5.7933 | 0.6143 | 1.55 | 56.1 | 4.41 | −35.9749 |
| S8 | Aspheric | −1.7640 | 1.0363 | | | | −13.9078 |
| S9 | Aspheric | 3.1540 | 0.3859 | 1.54 | 55.9 | −3.03 | −90.0000 |
| S10 | Aspheric | 1.0281 | 0.2689 | | | | −7.5259 |
| S11 | Spherical | Infinite | 0.2100 | 1.52 | 64.2 | | |

TABLE 5-continued

| Surface number | Surface type | Radius of curvature | Thickness/ Distance | Material Refractive index | Abbe number | Focal length | Conic coefficient |
|---|---|---|---|---|---|---|---|
| S12 | Spherical | Infinite | 0.2355 | | | | |
| S13 | Spherical | Infinite | | | | | |

TABLE 6

| Surface number | A4 | A6 | A8 | A10 | A12 |
|---|---|---|---|---|---|
| S1 | 2.5648E−02 | 1.7821E−01 | −1.5898E+00 | 1.0534E+01 | −4.3213E+01 |
| S2 | −6.8652E−02 | 1.3085E−01 | −1.6568E+00 | 1.3690E+01 | −6.9043E+01 |
| S3 | −4.9961E−02 | −5.3206E−02 | 2.9097E+00 | −2.4149E+01 | 1.2361E+02 |
| S4 | −4.6656E−02 | 4.2545E−01 | −3.1236E+00 | 2.2817E+01 | −1.0598E+02 |
| S5 | −3.5582E−01 | 3.9742E−01 | −2.9739E+00 | 1.5726E+01 | −5.4461E+01 |
| S6 | −3.5876E−01 | 4.5410E−01 | −1.8556E+00 | 6.2015E+00 | −1.3717E+01 |
| S7 | −1.4050E−01 | 2.0987E−01 | −4.6610E−01 | 1.1846E+00 | −1.6243E+00 |
| S8 | −3.3061E−01 | 5.9804E−01 | −9.2921E−01 | 1.1542E+00 | −9.1299E−01 |
| S9 | −3.2467E−01 | 2.2205E−01 | −9.3137E−02 | 2.7402E−02 | −5.5946E−03 |
| S10 | −1.2747E−01 | 7.8349E−02 | −3.4325E−02 | 1.0628E−02 | −2.3049E−03 |

| Surface number | A14 | A16 | A18 | A20 |
|---|---|---|---|---|
| S1 | 1.1165E+02 | −1.7462E+02 | 1.5048E+02 | −5.4436E+01 |
| S2 | 2.1137E+02 | −3.9122E+02 | 4.0574E+02 | −1.8502E+02 |
| S3 | −4.0049E+02 | 7.9173E+02 | −8.6863E+02 | 4.0455E+02 |
| S4 | 3.1184E+02 | −5.6307E+02 | 5.7098E+02 | −2.4871E+02 |
| S5 | 1.1814E+02 | −1.5347E+02 | 1.1086E+02 | −3.4736E+01 |
| S6 | 1.9767E+01 | −1.7293E+01 | 8.3846E+00 | −1.7537E+00 |
| S7 | 1.2387E+00 | −5.4200E−01 | 1.2848E−01 | −1.2868E−02 |
| S8 | 4.4132E−01 | −1.2769E−01 | 2.0443E−02 | −1.3994E−03 |
| S9 | 7.6708E−04 | −6.7075E−05 | 3.3758E−06 | −7.4438E−08 |
| S10 | 3.3478E−04 | −3.0611E−05 | 1.5861E−06 | −3.5475E−08 |

Figure 6A:
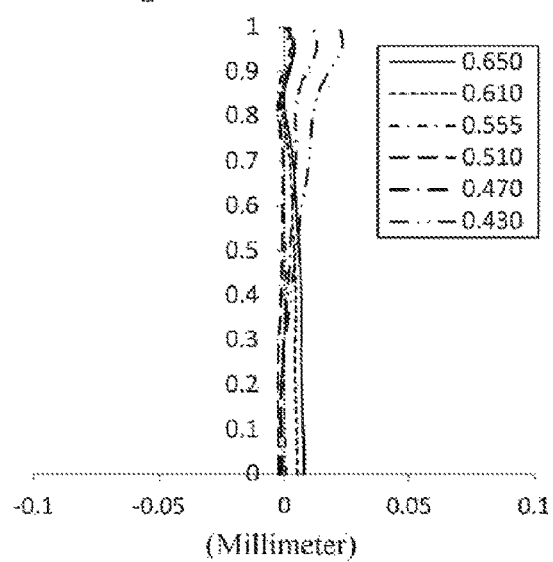
FIGS. 6A to 6D illustrate a longitudinal aberration curve, an astigmatic curve, a distortion curve, and a lateral color curve of the optical imaging system of the example 3, respectively.
Figure 6B:
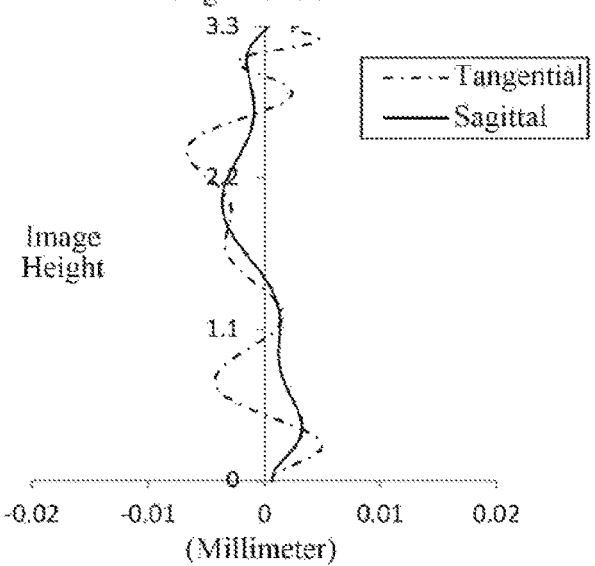
Figure 6C:
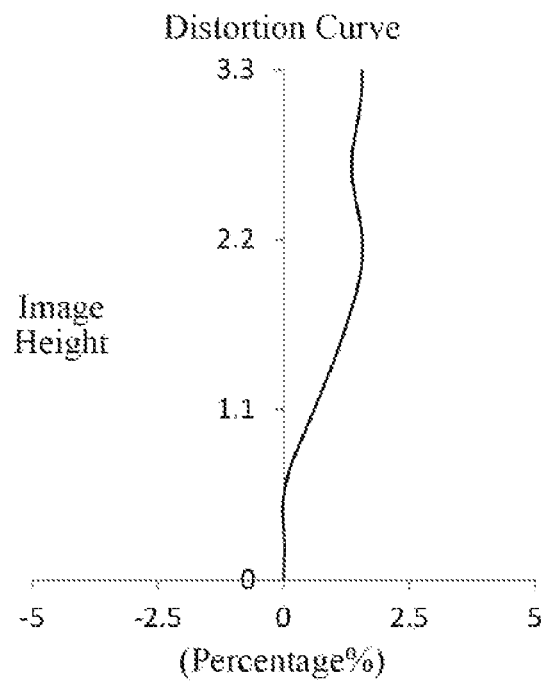
Figure 6D:
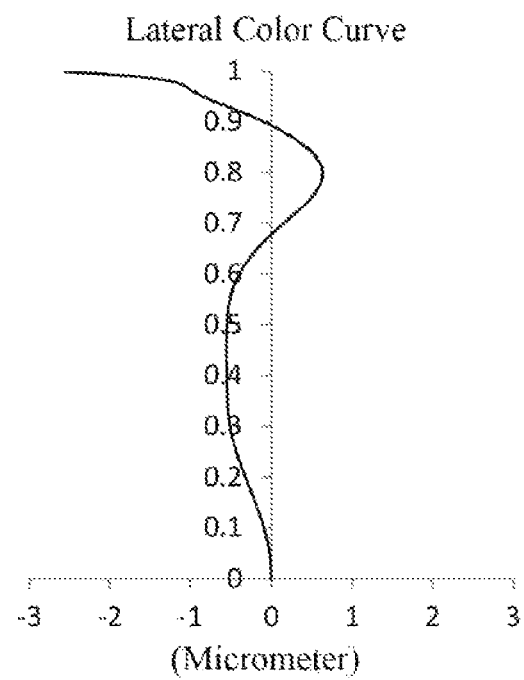

FIG. 6A illustrates a longitudinal aberration curve of the optical imaging system according to example 3, representing deviations of focal points converged by light of different wavelengths after passing through the lens assembly. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion corresponding to different image heights. FIG. 6D illustrates a lateral color curve of the optical imaging system according to example 3, representing deviations of different image heights on an imaging plane after light passes through the lens assembly. It can be seen from FIG. 6A to FIG. 6D that the optical imaging system provided in example 3 may achieve good image quality.

Example 4

Figure 7:
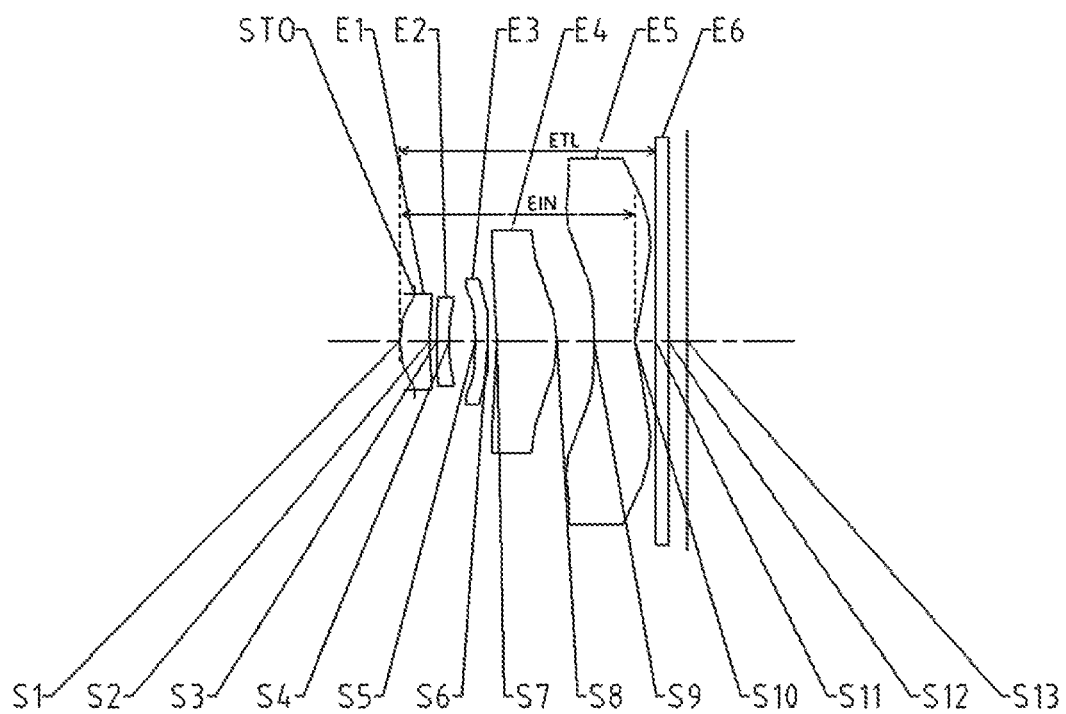
FIG. 7 illustrates a schematic structural view of an optical imaging system according to example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is concave, and an image-side surface S6 thereof is convex. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.86 mm, a total length TTL of the optical imaging system is 4.60 mm, half of a diagonal length ImgH of an effective pixel area on the imaging plane S13 of the optical imaging system is 3.38 mm, half of a maximum field-of-view Semi-FOV of the optical imaging system is 40.3°, an aperture value Fno of the optical imaging system is 2.48, a distance ETL from the object-side surface of the first lens to the imaging plane of the optical imaging system parallel to the optical axis at ½ of an entrance pupil diameter of the optical imaging system is 4.34 mm, and a distance EIN from the object-side surface of the first lens to the image-side surface of the fifth lens parallel to the optical axis at ½ of the entrance pupil diameter of the optical imaging system is 3.52 mm.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 380.0000 | | | | |
| STO | Spherical | Infinite | −0.2547 | | | | |
| S1 | Aspheric | 1.3541 | 0.4670 | 1.55 | 56.1 | 3.02 | −0.2868 |
| S2 | Aspheric | 6.6666 | 0.1489 | | | | 58.9905 |
| S3 | Aspheric | 8.9832 | 0.2000 | 1.68 | 19.2 | −6.85 | −87.3278 |
| S4 | Aspheric | 3.0314 | 0.4468 | | | | 4.4887 |
| S5 | Aspheric | −16.0145 | 0.2007 | 1.67 | 20.4 | −42.40 | −15.4330 |
| S6 | Aspheric | −37.1494 | 0.2522 | | | | −90.0000 |
| S7 | Aspheric | −7.4211 | 0.8212 | 1.55 | 56.1 | 4.14 | −62.3997 |
| S8 | Aspheric | −1.7990 | 0.5733 | | | | −7.6134 |
| S9 | Aspheric | 4.1316 | 0.5212 | 1.54 | 55.9 | −3.18 | −88.8408 |
| S10 | Aspheric | 1.1553 | 0.3960 | | | | −6.4743 |
| S11 | Spherical | Infinite | 0.2100 | 1.52 | 64.2 | | |
| S12 | Spherical | Infinite | 0.3626 | | | | |
| S13 | Spherical | Infinite | | | | | |

TABLE 8

| Surface number | A4 | A6 | A8 | A10 | A12 |
|---|---|---|---|---|---|
| S1 | 2.7338E−02 | 8.5019E−02 | −5.2591E−01 | 3.0417E+00 | −1.0902E+01 |
| S2 | −4.1795E−02 | 4.9969E−02 | −2.7055E−01 | 1.8164E+00 | −6.9222E+00 |
| S3 | −6.4154E−02 | 1.4886E−01 | −2.1928E−01 | 1.7353E+00 | −8.4730E+00 |
| S4 | −5.9532E−02 | 2.2118E−01 | −5.3412E−01 | 2.6838E+00 | −8.9760E+00 |
| S5 | −3.1049E−01 | 7.9269E−02 | −1.1228E+00 | 6.4698E+00 | −2.1312E+01 |
| S6 | −2.8402E−01 | 8.1524E−02 | −5.0381E−01 | 2.3135E+00 | −5.6832E+00 |
| S7 | −6.9039E−02 | 3.7227E−02 | −1.0997E−01 | 3.6665E−01 | −4.6128E−01 |
| S8 | −1.9218E−01 | 2.5136E−01 | −2.7968E−01 | 2.6598E−01 | −1.6092E−01 |
| S9 | −3.0808E−01 | 2.1550E−01 | −9.3558E−02 | 2.8736E−02 | −6.1432E−03 |
| S10 | −1.2682E−01 | 7.5782E−02 | −3.2864E−02 | 9.9858E−03 | −2.1376E−03 |

| Surface number | A14 | A16 | A18 | A20 |
|---|---|---|---|---|
| S1 | 2.5014E+01 | −3.4789E+01 | 2.6651E+01 | −8.4972E+00 |
| S2 | 1.4227E+01 | −1.3441E+01 | 1.9472E+00 | 3.5296E+00 |
| S3 | 2.1902E+01 | −2.9963E+01 | 1.9298E+01 | −3.7244E+00 |
| S4 | 1.8895E+01 | −2.3701E+01 | 1.6590E+01 | −4.9659E+00 |
| S5 | 4.1548E+01 | −4.6345E+01 | 2.7790E+01 | −6.9887E+00 |
| S6 | 8.4323E+00 | −7.1681E+00 | 3.2298E+00 | −6.0533E−01 |
| S7 | 2.9885E−01 | −1.0848E−01 | 2.1100E−02 | −1.7217E−03 |
| S8 | 5.8786E−02 | −1.2744E−02 | 1.5189E−03 | −7.6971E−05 |
| S9 | 8.8223E−04 | −8.0790E−05 | 4.2585E−06 | −9.8375E−08 |
| S10 | 3.1319E−04 | −2.9765E−05 | 1.6493E−06 | −4.0254E−08 |

Figure 8A:
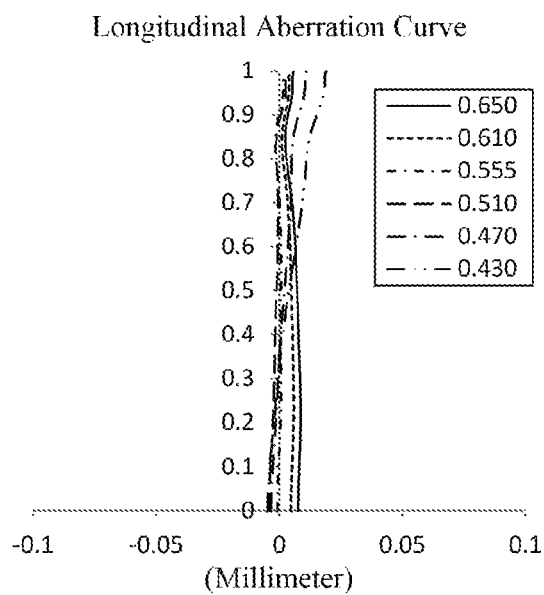
FIGS. 8A to 8D illustrate a longitudinal aberration curve, an astigmatic curve, a distortion curve, and a lateral color curve of the optical imaging system of the example 4, respectively.
Figure 8B:
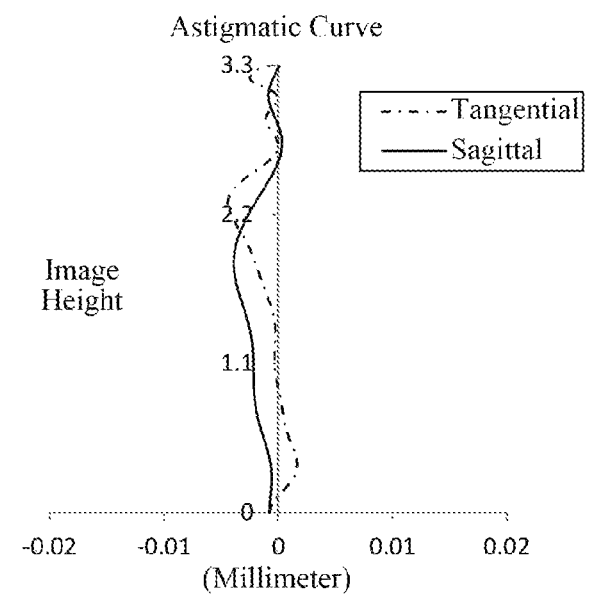
Figure 8C:
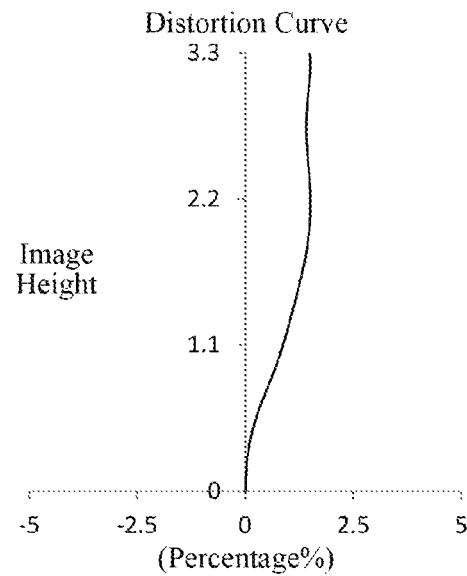
Figure 8D:
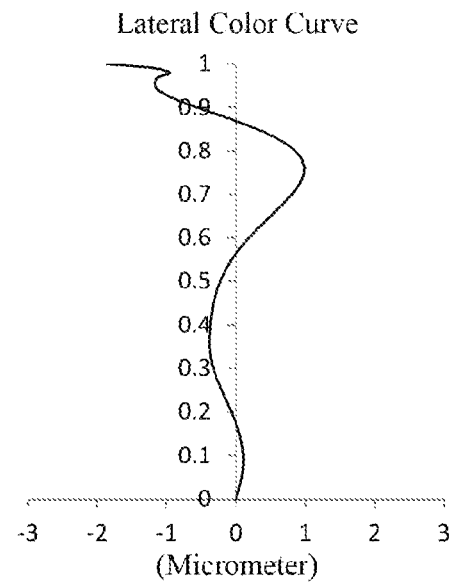

FIG. 8A illustrates a longitudinal aberration curve of the optical imaging system according to example 4, representing deviations of focal points converged by light of different wavelengths after passing through the lens assembly. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion corresponding to different image heights. FIG. 8D illustrates a lateral color curve of the optical imaging system according to example 4, representing deviations of different image heights on an imaging plane after light passes through the lens assembly. It can be seen from FIG. 8A to FIG. 8D that the optical imaging system provided in example 4 may achieve good image quality.

Example 5

Figure 9:
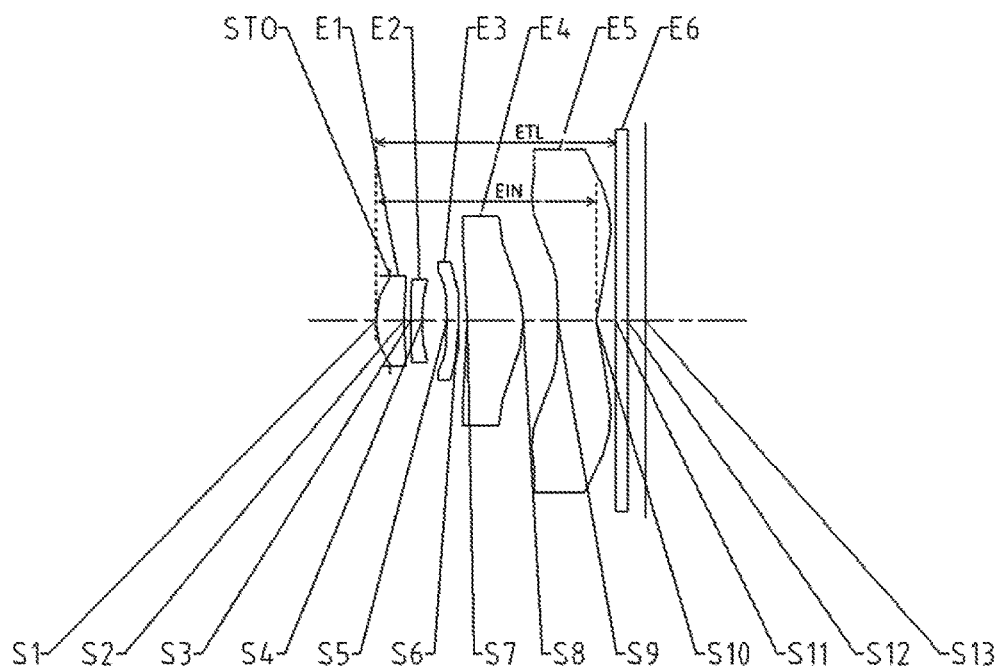
FIG. 9 illustrates a schematic structural view of an optical imaging system according to example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.82 mm, a total length TTL of the optical imaging system is 4.65 mm, half of a diagonal length ImgH of an effective pixel area on the imaging plane S13 of the optical imaging system is 3.28 mm, half of a maximum field-of-view Semi-FOV of the optical imaging system is 39.8°, an aperture value Fno of the optical imaging system is 2.48, a distance ETL from the object-side surface of the first lens to the imaging plane of the optical imaging system parallel to the optical axis at ½ of an entrance pupil diameter of the optical imaging system is 4.41 mm, and a distance EIN from the object-side surface of the first lens to the image-side surface of the fifth lens parallel to the optical axis at ½ of the entrance pupil diameter of the optical imaging system is 3.63 mm.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 391.5783 | | | | |
| STO | Spherical | Infinite | −0.2393 | | | | |
| S1 | Aspheric | 1.4002 | 0.4447 | 1.55 | 56.1 | 3.19 | −0.2422 |
| S2 | Aspheric | 6.3729 | 0.1571 | | | | 56.2990 |
| S3 | Aspheric | 7.8623 | 0.2000 | 1.68 | 19.2 | −7.38 | −90.0000 |
| S4 | Aspheric | 3.0259 | 0.4822 | | | | 3.8759 |
| S5 | Aspheric | −65.5335 | 0.2029 | 1.67 | 20.4 | −20.24 | 1.7444 |
| S6 | Aspheric | 17.0030 | 0.2620 | | | | −45.5633 |
| S7 | Aspheric | 98.2409 | 0.9422 | 1.55 | 56.1 | 3.43 | 90.0000 |
| S8 | Aspheric | −1.9027 | 0.5975 | | | | −6.5354 |
| S9 | Aspheric | 3.9463 | 0.4335 | 1.54 | 55.9 | −2.88 | −90.0000 |
| S10 | Aspheric | 1.0684 | 0.4031 | | | | −6.0818 |
| S11 | Spherical | Infinite | 0.2164 | 1.52 | 64.2 | | |
| S12 | Spherical | Infinite | 0.3084 | | | | |
| S13 | Spherical | Infinite | | | | | |

TABLE 10

| Surface number | A4 | A6 | A8 | A10 | A12 |
|---|---|---|---|---|---|
| S1 | 2.4144E−02 | 1.0370E−01 | −7.4757E−01 | 4.4791E+00 | −1.6492E+01 |
| S2 | −4.5268E−02 | 7.4807E−02 | −7.1602E−01 | 5.6451E+00 | −2.6045E+01 |
| S3 | −6.6831E−02 | 1.6263E−01 | −6.5451E−01 | 5.3163E+00 | −2.5338E+01 |
| S4 | −7.1419E−02 | 3.2049E−01 | −1.6251E+00 | 9.3303E+00 | −3.3697E+01 |
| S5 | −3.1093E−01 | 1.3082E−01 | −5.9200E−01 | 2.8795E+00 | −8.7865E+00 |
| S6 | −3.0494E−01 | 1.3556E−01 | −2.3552E−01 | 7.8402E−01 | −1.7256E+00 |
| S7 | −5.3419E−02 | −8.9458E−03 | 3.7463E−02 | 2.0358E−02 | −5.1279E−02 |
| S8 | −1.2659E−01 | 1.3569E−01 | −1.3160E−01 | 1.1483E−01 | −6.1779E−02 |
| S9 | −3.4653E−01 | 2.3347E−01 | −9.4258E−02 | 2.6598E−02 | −5.2527E−03 |
| S10 | −1.4129E−01 | 8.6601E−02 | −3.6876E−02 | 1.0905E−02 | −2.2454E−03 |

| Surface number | A14 | A16 | A18 | A20 |
|---|---|---|---|---|
| S1 | 3.8411E+01 | −5.4139E+01 | 4.2123E+01 | −1.3753E+01 |
| S2 | 7.1538E+01 | −1.1529E+02 | 1.0087E+02 | −3.7033E+01 |
| S3 | 6.9999E+01 | −1.1207E+02 | 9.6485E+01 | −3.4528E+01 |
| S4 | 7.5523E+01 | −1.0154E+02 | 7.4932E+01 | −2.3205E+01 |
| S5 | 1.5777E+01 | −1.5848E+01 | 8.4207E+00 | −1.8930E+00 |
| S6 | 2.2880E+00 | −1.6278E+00 | 5.7234E−01 | −7.8544E−02 |
| S7 | 3.2599E−02 | −1.0232E−02 | 1.6414E−03 | −1.0790E−04 |
| S8 | 1.9614E−02 | −3.6480E−03 | 3.7002E−04 | −1.5867E−05 |
| S9 | 7.0416E−04 | −6.0749E−05 | 3.0365E−06 | −6.6798E−08 |
| S10 | 3.1344E−04 | −2.8183E−05 | 1.4699E−06 | −3.3661E−08 |

Figure 10A:
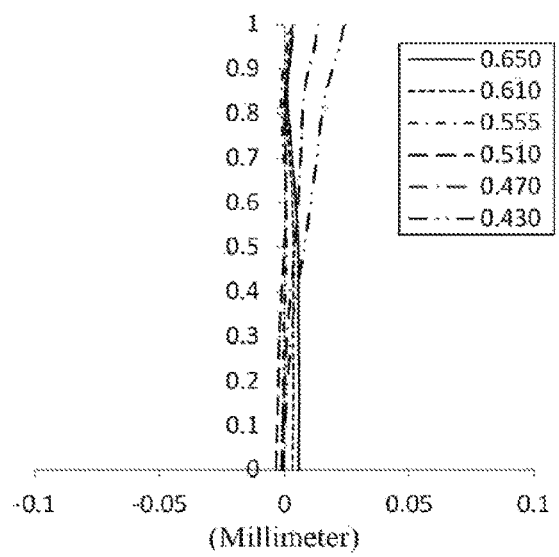
FIGS. 10A to 10D illustrate a longitudinal aberration curve, an astigmatic curve, a distortion curve, and a lateral color curve of the optical imaging system of the example 5, respectively.
Figure 10B:
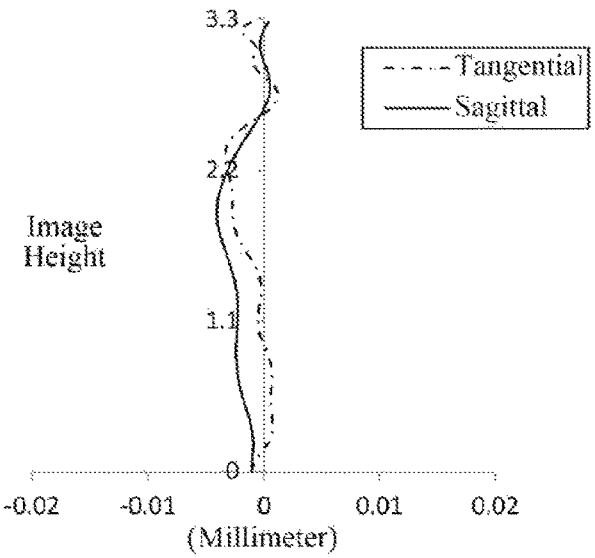
Figures 10C, 10D:
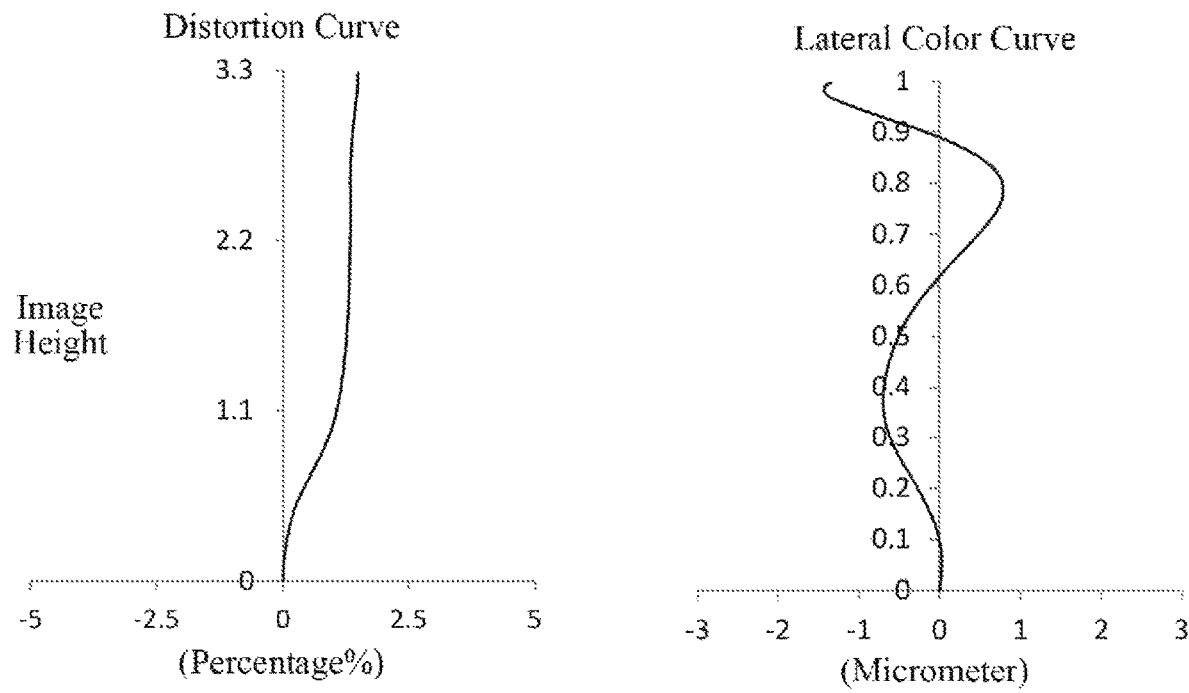

FIG. 10A illustrates a longitudinal aberration curve of the optical imaging system according to example 5, representing deviations of focal points converged by light of different wavelengths after passing through the lens assembly. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion corresponding to different image heights. FIG. 10D illustrates a lateral color curve of the optical imaging system according to example 5, representing deviations of different image heights on an imaging plane after light passes through the lens assembly. It can be seen from FIG. 10A to FIG. 10D that the optical imaging system provided in example 5 may achieve good image quality.

Example 6

Figure 11:
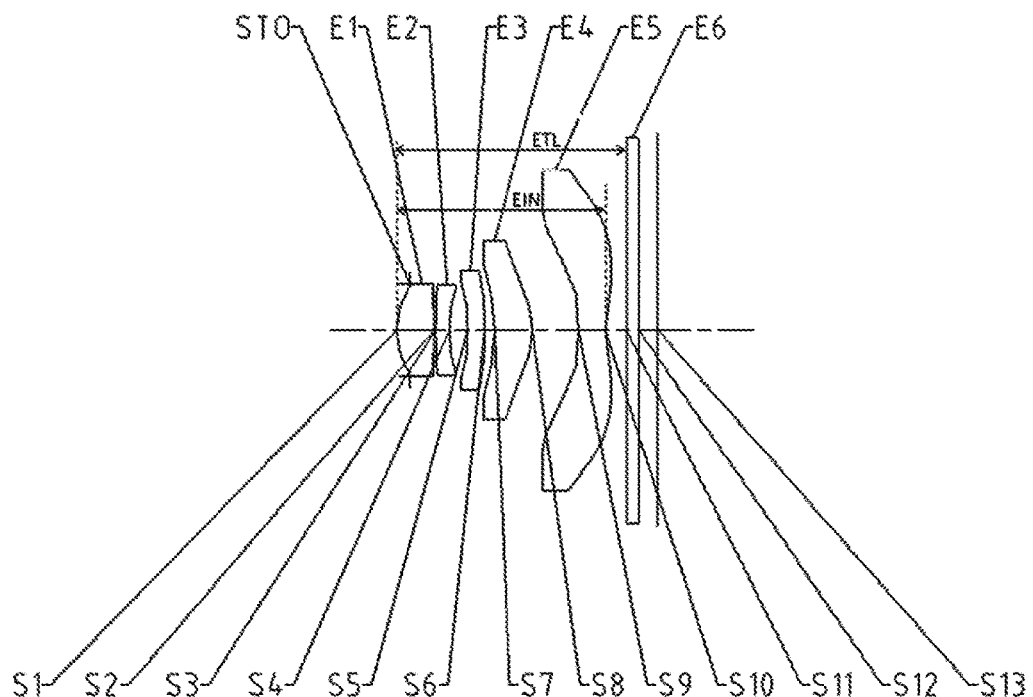
FIG. 11 illustrates a schematic structural view of an optical imaging system according to example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a stop STO, a first lens E1, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is concave, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is concave, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the optical imaging system is 3.77 mm, a total length TTL of the optical imaging system is 4.35 mm, half of a diagonal length ImgH of an effective pixel area on the imaging plane S13 of the optical imaging system is 3.28 mm, half of a maximum field-of-view Semi-FOV of the optical imaging system is 40.3°, an aperture value Fno of the optical imaging system is 2.48, a distance ETL from the object-side surface of the first lens to the imaging plane of the optical imaging system parallel to the optical axis at ½ of an entrance pupil diameter of the optical imaging system is 4.11 mm, and a distance EIN from the object-side surface of the first lens to the image-side surface of the fifth lens parallel to the optical axis at ½ of the entrance pupil diameter of the optical imaging system is 3.33 mm.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | 380.0000 | | | | |
| STO | Spherical | Infinite | −0.2252 | | | | |
| S1 | Aspheric | 1.3340 | 0.6200 | 1.55 | 56.1 | 2.79 | −0.5092 |
| S2 | Aspheric | 9.0042 | 0.0262 | | | | 34.6713 |
| S3 | Aspheric | 9.0037 | 0.2300 | 1.68 | 19.2 | −7.83 | −70.9260 |
| S4 | Aspheric | 3.3028 | 0.3042 | | | | 9.2904 |
| S5 | Aspheric | −14.5940 | 0.2800 | 1.67 | 20.4 | −15.24 | −89.6340 |
| S6 | Aspheric | 33.6515 | 0.1658 | | | | 90.0000 |
| S7 | Aspheric | −4.5122 | 0.6346 | 1.55 | 56.1 | 4.18 | −29.5831 |
| S8 | Aspheric | −1.5897 | 0.7665 | | | | −15.1204 |
| S9 | Aspheric | −46.7588 | 0.4500 | 1.54 | 55.9 | −2.91 | 73.5892 |
| S10 | Aspheric | 1.6214 | 0.3456 | | | | −10.8837 |
| S11 | Spherical | Infinite | 0.2100 | 1.52 | 64.2 | | |
| S12 | Spherical | Infinite | 0.3122 | | | | |
| S13 | Spherical | Infinite | | | | | |

TABLE 12

| Surface number | A4 | A6 | A8 | A10 | A12 |
|---|---|---|---|---|---|
| S1 | 1.1705E−02 | 2.6105E−01 | −2.5347E+00 | 1.5082E+01 | −5.6484E+01 |
| S2 | −1.7549E−01 | −6.8707E−01 | 1.4038E+01 | −9.4934E+01 | 3.5697E+02 |
| S3 | −1.0686E−01 | −5.1282E−01 | 1.2525E+01 | −8.2055E+01 | 2.9439E+02 |
| S4 | −6.9893E−02 | 1.2900E+00 | −1.2622E+01 | 8.8669E+01 | −3.8810E+02 |
| S5 | −3.5217E−01 | 1.4603E+00 | −1.4011E+01 | 9.1055E+01 | −3.6834E+02 |
| S6 | −3.1329E−01 | 2.2143E−01 | 4.6401E−01 | −2.5032E+00 | 7.1749E+00 |
| S7 | −2.0362E−01 | −1.9648E−01 | 1.5122E+00 | −3.3972E+00 | 6.0160E+00 |
| S8 | −4.6012E−01 | 8.7619E−01 | −1.4785E+00 | 1.9112E+00 | −1.5031E+00 |

TABLE 12-continued

| | | | | |
|---|---|---|---|---|
| S9 | −3.8657E−01 | 3.3067E−01 | −1.8184E−01 | 7.3149E−02 −2.0533E−02 |
| S10 | −1.6221E−01 | 1.0956E−01 | −5.1806E−02 | 1.6331E−02 −3.3915E−03 |

| Surface number | A14 | A16 | A18 | A20 |
|---|---|---|---|---|
| S1 | 1.3342E+02 | −1.9345E+02 | 1.5712E+02 | −5.4835E+01 |
| S2 | −8.2221E+02 | 1.1595E+03 | −9.2751E+02 | 3.2422E+02 |
| S3 | −6.3993E+02 | 8.4618E+02 | −6.3396E+02 | 2.0853E+02 |
| S4 | 1.0457E+03 | −1.6824E+03 | 1.4823E+03 | −5.5045E+02 |
| S5 | 9.2077E+02 | −1.3869E+03 | 1.1561E+03 | −4.1004E+02 |
| S6 | −1.3147E+01 | 1.4328E+01 | −8.2274E+00 | 1.8973E+00 |
| S7 | −8.0948E+00 | 6.8062E+00 | −3.0760E+00 | 5.6837E−01 |
| S8 | 6.8157E−01 | −1.6809E−01 | 1.8730E−02 | −4.0577E−04 |
| S9 | 3.8217E−03 | −4.4649E−04 | 2.9599E−05 | −8.4896E−07 |
| S10 | 4.4123E−04 | −3.2219E−05 | 9.9463E−07 | 7.6927E−10 |

Figure 12A:
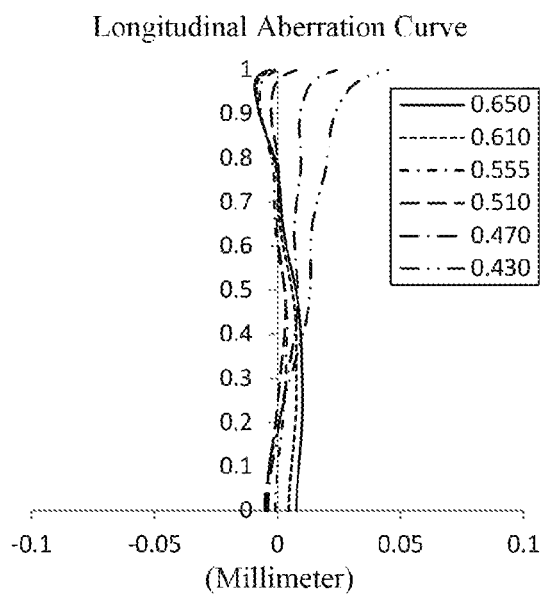
FIGS. 12A to 12D illustrate a longitudinal aberration curve, an astigmatic curve, a distortion curve, and a lateral color curve of the optical imaging system of the example 6, respectively.
Figure 12B:
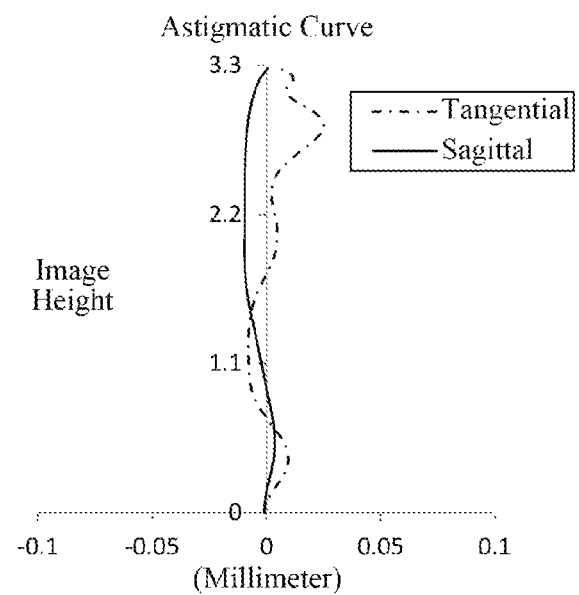
Figure 12C:
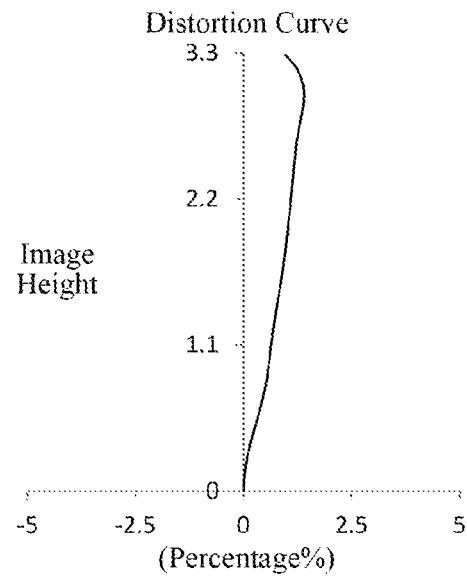
Figure 12D:
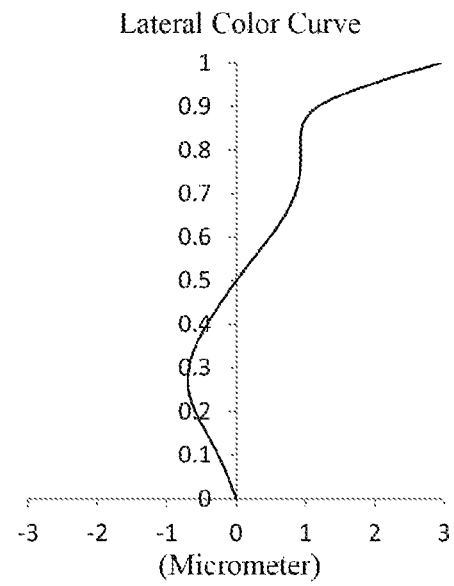

FIG. 12A illustrates a longitudinal aberration curve of the optical imaging system according to example 6, representing deviations of focal points converged by light of different wavelengths after passing through the lens assembly. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion corresponding to different image heights. FIG. 12D illustrates a lateral color curve of the optical imaging system according to example 6, representing deviations of different image heights on an imaging plane after light passes through the lens assembly. It can be seen from FIG. 12A to FIG. 12D that the optical imaging system provided in example 6 may achieve good image quality.

In view of the above, examples 1 to 6 respectively satisfy the relationship shown in Table 13.

TABLE 13

| Condition/Example | 1 | 2 | 3 | 4 | 5 | 6 |
|---|---|---|---|---|---|---|
| TTL/ImgH | 1.41 | 1.40 | 1.25 | 1.36 | 1.42 | 1.32 |
| ΣAL/T34 | 8.49 | 8.09 | 8.81 | 5.64 | 5.72 | 7.62 |
| f/(f2 + f4) | −1.33 | −1.52 | −1.44 | −1.43 | −0.97 | −1.03 |
| (T12 + T45)/T23 | 1.69 | 1.82 | 3.15 | 1.62 | 1.56 | 2.61 |
| f4/(|R8| + R10) | 1.29 | 1.36 | 1.58 | 1.40 | 1.15 | 1.30 |
| (|R6| + R3)/(R2 + R4) | 2.40 | 3.24 | 3.33 | 4.76 | 2.65 | 3.47 |
| CT4/T34 | 6.45 | 5.51 | 3.18 | 3.26 | 3.60 | 3.83 |
| ETL/EIN | 1.19 | 1.19 | 1.17 | 1.23 | 1.21 | 1.23 |
| ET5/ET1 | 3.28 | 2.96 | 2.32 | 1.83 | 2.44 | 1.16 |
| f23/f5 | 1.54 | 1.45 | 1.73 | 1.84 | 1.84 | 1.76 |
| CT4/ET4 | 1.55 | 1.63 | 1.80 | 1.66 | 1.81 | 1.75 |
| f12/f | 1.13 | 1.12 | 1.21 | 1.18 | 1.26 | 1.01 |
| DT51/(DT11 + DT21) | 1.67 | 1.79 | 1.95 | 1.78 | 1.64 | 1.56 |
| CT5/CT3 | 3.29 | 2.84 | 1.93 | 2.60 | 2.14 | 1.61 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, sequentially from an object side to an image side of the optical imaging system along an optical axis, comprising:
   a first lens having refractive power;
   a second lens having negative refractive power;
   a third lens having negative refractive power;
   a fourth lens having refractive power, a convex image-side surface; and
   a fifth lens having refractive power,
   wherein $1.0 < TTL/ImgH < 1.5$,
   where TTL is a distance along the optical axis from an object-side surface of the first lens to an imaging plane of the optical imaging system, and ImgH is half of a diagonal length of an effective pixel area on the imaging plane of the optical imaging system; and $$5.5 < \Sigma AT/T34 < 9.0,$$

where ΣAT is a sum of the spaced intervals along the optical axis between each two adjacent lenses of the first lens to the fifth lens, and T34 is a spaced interval between the third lens and the fourth lens along the optical axis.

2. The optical imaging system according to claim 1, wherein $-2.0 < f/(f2+f4) < -0.5$,
   where f is a total effective focal length of the optical imaging system, f2 is an effective focal length of the second lens, and f4 is an effective focal length of the fourth lens.

3. The optical imaging system according to claim 1, wherein $1.5 < (T12+T45)/T23 < 3.5$,
   where T12 is a spaced interval between the first lens and the second lens along the optical axis, T23 is a spaced interval between the second lens and the third lens along the optical axis, and T45 is a spaced interval between the fourth lens and the fifth lens along the optical axis.

4. The optical imaging system according to claim 1, wherein $1.1 < f4/(|R8|+R10) < 2.0$,
   where f4 is an effective focal length of the fourth lens, R8 is a radius of curvature of the image-side surface of the fourth lens, and R10 is a radius of curvature of an image-side surface of the fifth lens.

5. The optical imaging system according to claim 1, wherein $2.0<(|R6|+R3)/(R2+R4)<5.0$,
where R2 is a radius of curvature of an image-side surface of the first lens, R3 is a radius of curvature of an object-side surface of the second lens, R4 is a radius of curvature of an image-side surface of the second lens, and R6 is a radius of curvature of an image-side surface of the third lens.

6. The optical imaging system according to claim 1, wherein $3.0<CT4/T34<6.5$,
where CT4 is a center thickness of the fourth lens along the optical axis, and T34 is a spaced interval between the third lens and the fourth lens along the optical axis.

7. The optical imaging system according to claim 1, wherein $1.0<ET5/ET1<3.5$,
where ET5 is an edge thickness of the fifth lens, and ET1 is an edge thickness of the first lens.

8. The optical imaging system according to claim 1, wherein $1.0<f23/f5<2.0$,
where f23 is a combined focal length of the second lens and the third lens, and f5 is an effective focal length of the fifth lens.

9. The optical imaging system according to claim 1, wherein $1.5<CT4/ET4<2.0$,
where CT4 is a center thickness of the fourth lens along the optical axis, and ET4 is an edge thickness of the fourth lens.

10. The optical imaging system according to claim 1, wherein $1.0<f12/f<1.5$,
where f12 is a combined focal length of the first lens and the second lens, and f is a total effective focal length of the optical imaging system.

11. The optical imaging system according to claim 1, wherein $1.5<DT51/(DT11+DT21)<2.0$,
where DT11 is a maximum effective radius of the object-side surface of the first lens, DT21 is a maximum effective radius of an object-side surface of the second lens, and DT51 is a maximum effective radius of an object-side surface of the fifth lens.

12. The optical imaging system according to claim 1, wherein $1.5<CT5/CT3<3.5$,
where CT5 is a center thickness of the fifth lens along the optical axis, and CT3 is a center thickness of the third lens along the optical axis.

13. An optical imaging system, sequentially from an object side to an image side of the optical imaging system along an optical axis, comprising:
a first lens having refractive power;
a second lens having negative refractive power;
a third lens having negative refractive power;
a fourth lens having refractive power; and
a fifth lens having refractive power,
wherein $1.0<ETL/EIN<1.5$,
where ETL is a distance from an object-side surface of the first lens to an imaging plane of the optical imaging system parallel to the optical axis at ½ of an entrance pupil diameter of the optical imaging system, and EIN is a distance from the object-side surface of the first lens to an image-side surface of the fifth lens parallel to the optical axis at ½ of the entrance pupil diameter of the optical imaging system.

14. The optical imaging system according to claim 13, wherein $5.5<\Sigma AT/T34<9.0$,
where $\Sigma AT$ is a sum of the spaced intervals along the optical axis between each two adjacent lenses of the first lens to the fifth lens, and T34 is a spaced interval between the third lens and the fourth lens along the optical axis.

15. The optical imaging system according to claim 13, wherein $-2.0<f/(f2+f4)<-0.5$,
where f is a total effective focal length of the optical imaging system, f2 is an effective focal length of the second lens, and f4 is an effective focal length of the fourth lens.

16. The optical imaging system according to claim 13, wherein $1.1<f4/(|R8|+R10)<2.0$,
where f4 is an effective focal length of the fourth lens, R8 is a radius of curvature of an image-side surface of the fourth lens, and R10 is a radius of curvature of the image-side surface of the fifth lens.

17. The optical imaging system according to claim 13, wherein $2.0<(|R6|+R3)/(R2+R4)<5.0$,
where R2 is a radius of curvature of an image-side surface of the first lens, R3 is a radius of curvature of an object-side surface of the second lens, R4 is a radius of curvature of an image-side surface of the second lens, and R6 is a radius of curvature of an image-side surface of the third lens.

18. The optical imaging system according to claim 13, wherein $1.0<f23/f5<2.0$,
where f23 is a combined focal length of the second lens and the third lens, and f5 is an effective focal length of the fifth lens.

19. The optical imaging system according to claim 13, wherein $1.0<f12/f<1.5$,
where f12 is a combined focal length of the first lens and the second lens, and f is a total effective focal length of the optical imaging system.

* * * * *